(12) United States Patent
Koehler et al.

(10) Patent No.: US 8,491,717 B2
(45) Date of Patent: Jul. 23, 2013

(54) MULTIVARIATE MANAGEMENT OF ENTRAINED AIR AND RHEOLOGY IN CEMENTITIOUS MIXES

(75) Inventors: Eric Koehler, Boston, MA (US); Mark F. Roberts, North Andover, MA (US)

(73) Assignee: Verifi LLC, West Chester, OH (US)

( * ) Notice: Subject to any disclaimer, the term of this patent is extended or adjusted under 35 U.S.C. 154(b) by 0 days.

(21) Appl. No.: 13/512,466

(22) Filed: May 29, 2012

(65) Prior Publication Data
US 2013/0145967 A1    Jun. 13, 2013

(51) Int. Cl.
C04B 7/36    (2006.01)

(52) U.S. Cl.
USPC ................... 106/713; 700/265; 366/8

(58) Field of Classification Search
USPC ..................... 106/713; 700/265; 366/8
See application file for complete search history.

(56) References Cited

U.S. PATENT DOCUMENTS

| | | | |
|---|---|---|---|
| 3,609,316 A * | 9/1971 | Brosset et al. | 700/239 |
| 4,008,093 A * | 2/1977 | Kitsuda et al. | 106/638 |
| 5,527,387 A * | 6/1996 | Andersen et al. | 106/693 |
| 5,713,663 A | 2/1998 | Zandberg et al. | |
| 5,895,116 A * | 4/1999 | Kreinheder et al. | 366/8 |
| 6,224,250 B1 * | 5/2001 | Kreinheder et al. | 366/8 |
| 6,484,079 B2 | 11/2002 | Buckelew et al. | |
| 6,611,755 B1 | 8/2003 | Coffee et al. | |
| 7,386,368 B2 * | 6/2008 | Andersen et al. | 700/265 |
| 7,972,436 B2 | 7/2011 | Ou et al. | |
| 8,020,431 B2 | 9/2011 | Cooley et al. | |
| 8,058,377 B1 | 11/2011 | Goc-Maciejewska et al. | |
| 8,311,678 B2 * | 11/2012 | Koehler et al. | 700/265 |
| 2002/0015354 A1 | 2/2002 | Buckelew | |
| 2002/0048212 A1 * | 4/2002 | Hill et al. | 366/8 |
| 2006/0039233 A1 * | 2/2006 | Farrington et al. | 366/8 |
| 2007/0185636 A1 | 8/2007 | Cooley | |
| 2007/0192257 A1 * | 8/2007 | Amey et al. | 705/400 |
| 2007/0266905 A1 * | 11/2007 | Amey et al. | 106/802 |
| 2008/0027584 A1 | 1/2008 | Andersen et al. | |
| 2009/0037026 A1 * | 2/2009 | Sostaric et al. | 700/265 |
| 2009/0158960 A1 * | 6/2009 | Andersen et al. | 106/15.05 |
| 2009/0171595 A1 | 7/2009 | Benegas | |
| 2011/0004332 A1 | 1/2011 | Andersen et al. | |
| 2011/0320040 A1 | 12/2011 | Koehler et al. | |

FOREIGN PATENT DOCUMENTS

| | | |
|---|---|---|
| DE | 4237543 | 5/1994 |
| DE | 4437970 | 5/1996 |
| EP | 0126573 | 11/1984 |
| EP | 0901017 | 10/1999 |
| EP | 2165815 | 3/2010 |
| GB | 1182590 | 2/1970 |
| GB | 2144240 | 2/1985 |
| GB | 2392502 | 3/2004 |
| GB | 2426347 | 11/2006 |

(Continued)

*Primary Examiner* — Paul Marcantoni
(74) *Attorney, Agent, or Firm* — Craig K. Leon; Stephan P. Williams

(57) ABSTRACT

The invention relates to a method and system for monitoring and adjusting both air content and rheology (e.g., slump, slump flow) properties of a hydratable concrete mix contained within a concrete mixer. The system simultaneously tracks dosage of both rheology-modifying admixture (e.g., polycarboxylate polymer cement dispersant) and air control agent or "ACA" (e.g., air entraining agent) by reference to at least four nominal dose response ("NDR") curves or profiles, which at least four NDR profiles are based on the respective behaviors of each of the ACA and rheology-modifying agent on air content and rheology.

18 Claims, 6 Drawing Sheets

FOREIGN PATENT DOCUMENTS

| | | |
|---|---|---|
| GB | 2432675 | 5/2007 |
| JP | 2001097749 | 4/2001 |
| TW | 224192 | 12/2003 |
| WO | 2007060272 | 5/2007 |
| WO | 2009126138 | 10/2009 |
| WO | 2009144523 | 12/2009 |
| WO | 2010111204 | 9/2012 |

* cited by examiner

MULTIVARIATE MANAGEMENT OF ENTRAINED AIR AND RHEOLOGY IN CEMENTITIOUS MIXES

FIELD OF THE INVENTION

The present invention relates to the manufacture of concrete, and more particularly to a method for monitoring and adjusting entrained air and rheology (e.g., slump, slump flow) properties in a fresh concrete contained in a concrete mixing drum using a process control system.

BACKGROUND OF THE INVENTION

In U.S. application Ser. No. 11/834,002, Sostaric et al. disclosed that plasticizers and air entraining agents can be dosed into the concrete contained in the mixing drum of a delivery truck using a process control system. However, it was not explained how rheological properties, on the one hand, and, air properties, on the other hand, could be simultaneously controlled.

It has been known, however, that "slump" or fluidity can be individually monitored and adjusted using a process control system. This is done by measuring the energy required for rotating concrete in a mixing drum using various sensors; correlating energy values with slump values (using a standard slump cone test); and storing this information in memory so that a computer processing unit ("CPU") can correlate the energy and slump values. See e.g., U.S. Pat. Nos. 4,008,093, and 5,713,663. As concrete stiffens over time, due to hydration, evaporation, and/or other factors, greater energy is required to rotate the drum, and the CPU can be programmed for activation of devices to inject water or chemical dispersant into the concrete mix.

Numerous patents have declared that various properties of concrete mixes can be monitored and adjusted through the use of sensor devices that are connected to a CPU. For example, in U.S. Pat. No. 5,713,663, Zandberg et al. deployed sensors for measuring amounts of batch water and particulate ingredients, sand moisture content, time, and other factors (See e.g., col. 8, lines 3-14). In US Patent Publication No. 2009/0037026, Sostaric et al. referred to sensors for detecting mixing drum temperature, rotational speed, "acceleration/deceleration/tilt," vibration, and other properties. These and other prior art publications contain the common suggestion that data gathered by the sensors can be listed in "look up" charts.

However, for all of these prescriptions concerning the usefulness of sensor-derived data, the monitoring and controlling of rheology (e.g., slump) and entrained air content have not been accurately or reliability achieved or integrated in practice. Although it is generally known that changing the air content affects slump and vice versa, the concrete industry has not able to predict what the slump of a concrete mix might be, for example, by doubling or multiplying entrained air levels. In other words, while slump might be increased as a general proposition by increasing air content, the precise extent to which slump is increased has not been reliably predicted based on how much air entraining admixture ("AEA") is introduced into the concrete mix. As a result, prior art devices have focused only on adjusting slump or other rheological property in the truck.

For concrete without AEA, adding cement dispersant typically has negligible effect on air content and prior art devices were designed only for adjusting slump. However, in air entrained concrete, the present inventors realize that changing rheology by adding cement dispersants substantially affects air content. They believe that an integrated approach to controlling both rheology and air content is needed for such cases.

The problem is that there is no consistent or linear correlation between rheological properties such as slump and the use of AEAs in concrete mixes. This is due largely to the nature of concrete, which is inconsistent from batch to batch, and even from day to day. Many factors lead to this inconsistency: including variability in batch mix design, ingredient quality and source, processing conditions (e.g., temperature, humidity, revolutions needed for particular mixing drum), and nature of dispersant and AEA employed. As further explained hereinafter, chemical dispersants and AEAs may have adverse and unpredictable effects on the performance of the other.

The prior art is devoid of precise teachings about how to administer AEAs and dispersants using an integrated approach in a concrete mixer. The present inventors believe that the number of problems created by AEAs for ready-mix producers, contractors, and owners far exceed those created by all other admixtures. Almost everything influences the performance of AEAs: e.g., ambient and concrete temperatures, travel time from plant to site, mixing time, cement type, and the nature and variability of cement dispersants (particularly polycarboxylate superplasticizers).

There are different types of air in concrete: entrapped air and entrained air. "Entrapped air" results from the mixing process, whereby air is mechanically enfolded (usually 1.5% by concrete volume) by churning aggregates or moving paddles within the mixing drum. Such entrapped air is visible to the eye as irregularly shaped voids when viewed, for example, in a sawn cross-section of hardened concrete. On the other hand, "entrained air" has the form of microscopic, spherically shaped voids; it thus becomes more easily distributed throughout the mix. The sizing and spacing of entrained air bubbles is important for enhancing durability of concrete subjected to freeze/thaw conditions. Air entraining admixtures are used to form and to stabilize these microscopic voids in the concrete.

What complicates matters is that typical measurement of entrained air in concrete involves a percentage reading of the total amount of air, which is to say both "entrapped" and "entrained" air. Where the percentage reading is 6% air, for example, this means approximately 1.5% of the total air is entrapped, while 4.5% is entrained air.

Further complicating matters is the fact that the concrete mixing drum and the motion of the delivery truck, which is jostled by travel over irregular roadways and surfaces, can increase the relative amount of "entrapped" air. On the other hand, the longer the time that the concrete is being transported in the truck, the more the free water content in the concrete decreases due to evaporation and hydration. As water is necessary for air bubble formation, the percentage of total air, including entrained air, can decrease.

A still further complicating factor is that different kinds of AEAs have different effects on bubble formation in the concrete mix and can be influenced differently depending on the type of dispersant used.

A wood-derived salt type AEA, such as Vinsol resin, is often used in low water concrete mixes to obtain a good bubble structure. When a superplasticizer is added, such as to obtain a higher slump at pour, entrained air levels tend to decrease. This continues the longer the concrete is mixed in the truck. Addition of air entraining admixture is thus required for this situation.

On the other hand, a synthetic resin type AEA (e.g., fatty acid salts or tall oil) works differently in that it tends to entrain more small bubbles as slump increases. Thus, if water is added to the concrete mix at pour, the amount of entrained air can increase potentially to excessive levels in certain situations.

In view of the foregoing, the present inventors believe that a novel method and automated process control system is needed for integrating and simultaneously monitoring and adjusting both air and rheology properties, using separate component additions of an air control admixture component and a rheology control admixture component, which hitherto have had unpredictable and adverse effects upon each other and upon the resultant concrete mix.

SUMMARY OF THE INVENTION

In surmounting the disadvantages of prior art, the present invention provides a method and process control management system for monitoring and adjusting air and rheology (e.g., slump, slump flow, yield stress) in hydratable cementitious mixes such as concrete in a mixing drum.

The system and methods of the invention are suitable for adjusting properties of concrete in a mixing drum through automated monitoring and controlled addition of additives, including at least one cement dispersant comprising water, polymer dispersant, or mixture thereof; and including at least one air controlling admixture (ACA) such as an air entraining admixture (AEA), an air detraining admixture (ADA), or a mixture thereof (AEA/ADA).

An exemplary system and method of the invention for monitoring and adjusting entrained air level and rheology in a hydratable cementitious mix, comprises:

(a) providing a concrete mix in a concrete mixer, said concrete mix comprising hydratable cement, aggregates, and water for hydrating said cement, and said concrete mix having a total volume when mixed uniformly of 1.0 to 15.0 cubic yards;

(b) inputting into a computer processing unit (CPU) and storing into computer accessible memory desired concrete performance ranges relative to:

a rheology target or target range (hereinafter "$R_T$") wherein a desired concrete slump or slump range is specified within a range of 0-11 inches (e.g., slump as determined based on standard slump cone test in accordance with ASTM C143-05 or other standard test); and an air content target or target range "$A_T$" wherein a desired concrete air content or air content range is within a range of 1% to 10% (which may be determined in accordance with standard tests set forth in ASTM C138-10, C173-10, and/or C231-10 or other standard test);

(c) operating said concrete mix in said rotatable concrete mixer and obtaining at least one rheology value in current time (hereinafter "$R_{CT}$") and at least one air content value in current time (hereinafter "$A_{CT}$");

(d) comparing using CPU said $R_{CT}$ against said $R_T$ and said $A_{CT}$ against said $A_T$ until detection by CPU of a non-conformance event wherein said $R_{CT}$ does not conform with said $R_T$ and/or said $A_{CT}$ does not conform with said $A_T$; and (e) introducing into the concrete mix contained in said concrete mixer, one of at least two different types of additives comprising:

at least one admixture for modifying entrained air level in the concrete mix (hereinafter "ACA") wherein said at least one ACA comprises Air Entraining Admixture (hereinafter "AEA"), Air Detraining Admixture ("ADA"), or mixture thereof; and at least one cement dispersant for modifying rheology of the concrete mix, said at least one cement dispersant comprising a polymeric cement dispersant, water, or mixture thereof;

said introducing of said at least one ACA and cement dispersant being achieved by CPU-controlled valve system in accordance with CPU-accessed memory device having at least four sets of data correlations: namely, (i) effect of said cement dispersant on rheology (e.g., slump); (ii) effect of said ACA on air content; (iii) effect of said ACA on rheology (e.g., slump); and (iv) effect of said cement dispersant on air content. The present invention can be employed for monitoring and controlling rheology properties such as slump, slump flow, and yield stress of the fresh hydratable cementitious composition.

Thus, systems and methods of the invention involve introduction of AEAs (air entraining admixtures), ADAs (air detraining admixtures, or "defoamers"), or combinations of AEAs and ADAs. Preferred embodiments involve introducing AEA and polycarboxylate polymer cement dispersant into a concrete mix. These are among the most problematic of chemical admixtures combinations to administer.

In preferred systems and processes of the invention, each of said correlations above-described in Paragraph (e)(i) through (e)(iv) is based on a set of data wherein respective amounts of the at least one ACA (as mentioned in steps "(e)(ii)" and "(e)(iii)") and at least one cement dispersant (as mentioned in steps "(e)(i)" and "(e)(iv)") are determined using nominal dosage response ("NDR") profiles. The NDR profiles are based on an average of at least two, and more preferably of a plurality (more than three) of, dosage/effect curves, as will be explained in further detail hereinafter. These NDR profiles do not require time-consuming compilations to be placed into "lookup tables" of parameters by the operator. These NDR profiles minimize the task of inputting numerous parameters at the outset of each batch preparation or delivery. A dose response curve represents a correlation between the dose amount of water and/or chemical admixture or admixtures to a property of the concrete that is modified by the effect of the water and/or chemical admixtures. The dose response curve may be represented in one of a number of forms, for clarity and convenience, and for ease of CPU programming. For instance, a dose response curve for a chemical admixture that modifies slump can be represented as the administered dose to the slump of the concrete. Alternatively, the dose response curve can be represented as the change in chemical admixture dose (or water) needed to change the slump by one incremental unit, for example, the dose needed to change slump by one inch (e.g., to change slump from 2 inches to 3 inches).

For purposes of the present application, a dose response curve for a given set of materials under a certain set of conditions which can be later used to select the proper dose during concrete production is referred to herein as the nominal dose response ("NDR") curve. Because the dose response curve is a function of a large number of variables (material properties, temperature, etc.), it is impractical to develop dose response curves that specifically involve consideration of all relevant variables, to program a CPU with look-up tables or the like which lists these specific variables, to measure all of these variables, and then to select the correct dose of the rheology-modifying agent (e.g., chemical admixture) to achieve a desired response. Thus, preferred methods and systems of the invention will employ the use of NDR profiles or curves based on data correlations.

It is a further objective of this invention to provide a means for efficiently and accurately updating nominal dose response ("NDR") curve information of both entrained air level data and rheology (e.g., slump) data. This will address the problems of specific external variables while avoiding having to take these variables into account explicitly. The present inventors surprisingly realized that when NDR curves are generated for both entrained air level and rheology level for each additive to be incorporated into concrete, then both air and rheology properties can be simultaneously, adaptively controlled through a novel, highly inventive yet elegant control methodology which is the subject matter of the present invention.

The present invention arises from two surprising discoveries: first, that concrete mixes have different parameters (e.g., temperature, mix design, water levels, hydration levels, humidity, different trucks) and display "dose response" profiles that vary in amplitude but otherwise have similar behavior in that their dosage response curves do not intersect; and, second, that the "dose response" profiles of the afore-mentioned four correlations of Paragraph (e)(i) through (e)(iv) can be monitored and adjusted, such that entrained air and rheology targets can be attained in integrated fashion. For example, if an architect or job supervisor requests delivery of a fresh concrete mix having a slump (rheology) target of, for example, "4 to 6 inches" (in reference to standard vertical slump cone test) and an entrained air content target of, for example, "4 to 6 percent," the systems and methods of the present invention can be deployed to achieve these performance targets based on known slump and air content monitoring equipment and known chemical admixtures. Such capability has not previously been attained or suggested in the concrete industry.

Further advantages and specific feature details of the invention are described hereinafter.

BRIEF DESCRIPTION OF DRAWINGS

Further advantages and features of the present invention may be more readily comprehended when the following detailed description of preferred embodiments is taken in conjunction with the appended drawings wherein.

DETAILED DESCRIPTION OF PREFERRED EMBODIMENTS

Figure 1:
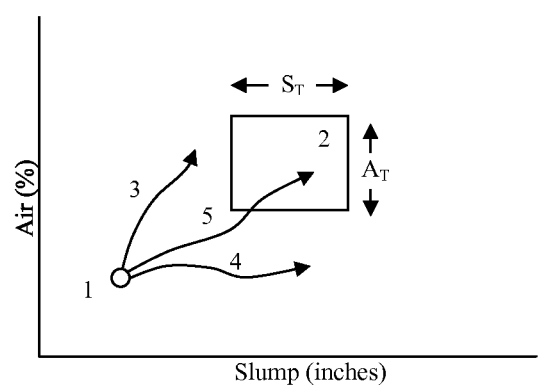
FIG. 1 is a graphic illustration of the exemplary method of the present invention in which, for a given concrete mix, the current air content and slump (rheology) designated at "1" are determined and compared with air content (range) target ("$A_T$") and slump target ("$S_T$"), together represented by the rectangle designated at "2"; and, where non-conformance is determined, the air and slump are adjusted by adding air entraining agent and/or cement dispersant based on at least four sets of data correlations: wherein the respective effects on both air content and slump are correlated with each of air entraining agent dosage increases (as illustrated by arrow designated at "3") and of cement dispersant dosage increases (as illustrated by arrow designated at "4"), the cumulative effects of which are illustrated by the arrow designated at "5" (indicating that entrained air and slump of the concrete mix have been brought within target ranges for $A_T$ and $S_T$)

The term "cementitious" refers to Portland Cement and/or cement substitutes (fly ash, blast furnace slag, limestone, pozzolan, etc.) which, when mixed with water, bind together fine aggregates such as sand into mortar, and, additionally, coarse aggregates such as crushed stone or gravel into concrete. These materials are "hydratable" in that they harden when mixed with water to form building materials and engineering structures.

It is contemplated that conventional cement dispersants and air controlling admixtures ("ACA") may be employed in the present invention, as well as other optional admixtures for modifying the rheology and entrained air of cementitious compositions such as mortars and concretes. In addition, any admixture that results in a change in rheology or air content, whether as the main effect or non-main (e.g. secondary) effect, can be managed using the methodology described herein.

For purposes of illustration, the rheology property known as "slump" will be discussed and illustrated herein. However, it is understood that the rheological properties known as "slump flow" and "yield stress" are related properties of fresh cementitious materials (e.g., concrete) that can also be monitored and controlled using the teachings of the present invention.

Known cement dispersants which can be used in the present invention include conventional plasticizers (including superplasticizers). These include lignosulfonates, naphthalene sulfonates, melamine sulfonates, hydroxycarboxylic acids, oligosaccharides, and mixtures thereof. Other known cement dispersants include plasticizers having oxyalkylene groups (e.g., ethylene oxide, propylene oxide, or mixtures thereof), polycarboxylic acid groups (or their salts or esters); or mixtures thereof. Many of these types of cement dispersants, some of which contain thickeners and other viscosity modifying agents for improved stability or other attributes, are available from Grace Construction Products (Cambridge, Mass.) under various trade names, such as DARACEM®, WRDA®, ADVA®, and MIRA®, and these are all deemed suitable cement dispersants which can be used in the present invention.

The term "cement dispersant" and "dispersant" as used herein shall mean and refer to water and to plasticizers which facilitate dispersion of hydratable cement particles within an aqueous suspension. In such context, it is understood that the term "plasticizer" refers to "water reducing" agents that allow hydratable mortars or concretes to be made using less water. "Superplasticizers" are thus termed because they permit 12% or more of water to be replaced in the cement paste portion. Such plasticizing agents are conventionally known.

Moreover, for purposes of the present invention, conventional cement dispersants may be employed containing one or more air controlling admixtures ("ACA") pre-mixed into the product formulation. It is contemplated that methods and systems of the invention include commercially available cement dispersant formulations to be used as the "cement dispersant" component, in combination with dosing of an additional, separate ACA component. For example, U.S. Pat. No. 7,792,436, owned by W. R. Grace & Co.—Conn., disclosed polycarboxylate cement dispersant formulated with air controlling admixtures, and this could be administered into the concrete mix as the "cement dispersant" component, and the same or different air controlling admixtures (entrainers and/or detrainers) can be separately dosed as the ACA component.

In other exemplary methods and systems of the present invention, it can be advantageous to use cement dispersants having comparatively quick mix-in dispersibility to expedite monitoring and adjustment of the concrete mix properties. In U.S. Pat. No. 8,085,37781, for example, Goc-Maciejewska et al. taught phosphate-containing polycarboxylate dispersants having oxyalkylene groups, acrylic acid groups, and ester groups for achieving quick mix-in dispersibility when using concrete mix equipment.

Known air controlling admixtures ("ACAs") suitable for use in the present invention include conventional Air Entraining Agents ("AEAs") as well as conventional Air Detraining Agents ("ADAs") (sometimes referred to as defoamers). Conventional AEAs include water soluble salts (usually sodium) of wood resin, wood rosin, or gum rosin; non-ionic surfactants (e.g., such as those commercially available from BASF under the trade name TRITON X-100); sulfonated hydrocarbons; proteinaceous materials; or fatty acids (e.g., tall oil fatty acid) and their esters.

AEAs believed suitable for purposes of the present invention are available from Grace Construction Products under the trade names DAREX®, DARAVAIR®, and AIRALON®.

Known air detraining admixtures ("ADAs") believed to be useful in the invention include tributyl phosphate, propoxylated amines, silicone, and mixtures thereof.

The term air controlling admixtures "ACAs" as used herein encompasses surface active agents and combinations thereof, and may involve both entraining and detraining properties, or otherwise have components having different effects on the air properties. For example, U.S. Pat. No. 7,792,436, as previously referenced above, discloses a combination involving (a) a first surface active agent comprising betaine, an alkyl or aryl or alkylaryl sulfonate, or mixture thereof, for the purpose of increasing air content in the concrete; and (b) a second surface active agent comprising a nonionic oxyalkylene-containing polymer surfactant for providing a fine and uniform air void distribution (with some detraining properties) within a suitable 3-20 percent range based on concrete volume. Thus, the present inventors contemplate that exemplary ACAs may be used having both entraining and detraining properties, such as for controlling both the quantity and quality of entrained air (e.g., size and spacing) with the (eventually hardened) concrete matrix.

The "ACA" component, similar to the cement dispersant component, may comprise a portion of one or more cement dispersants in addition to AEA and/or ADA. Indeed, additional conventional concrete admixtures may be incorporated into either or both of the "ACA" and "cement dispersant" components for added performance values, and these include set accelerators, set retarders, and the like.

Concrete delivery mixing trucks having slump control monitoring and control equipment, such as hydraulic and/or electric sensors for measuring the energy for turning the mixing drum, speed sensors for measuring the speed of rotation, temperature sensors for monitoring the atmospheric temperature as well as the mix temperature, and dispensing equipment, as well as the computer processing units (CPU) for monitoring signals from the sensors and actuating the dispensing equipment are by now relatively well known in the industry. For example, such slump control systems, which can be used optionally in association with wireless communication systems, are disclosed in U.S. Pat. No. 5,713,663; U.S. Pat. No. 6,484,079; U.S. Ser. No. 09/845,660 (Publication no. 2002/0015354A1); U.S. Ser. No. 10/599,130 (Publication no. 2007/0185636A1); U.S. Pat. No. 8,020,431; U.S. Ser. No. 11/834,002 (Publication no. 2009/0037026); and WO 2009/126138.

A further exemplary system for monitoring and control using wireless communications in combination with sensors for monitoring various physical properties of the concrete mix is taught in U.S. Pat. No. 6,611,755 of Coffee. These teachings, as well as the patent references as previously discussed in the background section above, are expressly incorporated herein by reference.

Also known in the industry (though perhaps to lesser extent) are sophisticated methods for monitoring and obtaining information about the quantity and/or characteristics of cementitious material in mixing drums (including slump and air content) by analyzing energy waveforms (e.g., hydraulic pressure), and, more preferably, by converting time-domain waveforms into frequency-domain spectra, whereby further information may be obtained and assessed. Such teachings are found in World Patent Application No. WO 2010/111,204 (entitled "Mixer Waveform Analysis for Monitoring and Controlling Concrete") of Koehler et al., incorporated herein by reference.

Thus, exemplary concrete mixing drums believed to be suitable for use in the present invention are those that are rotatably mounted on ready-mix delivery trucks, as mentioned above, or on stationary mixers as may be found in commercial mixing plants. The inner drum surfaces, particularly of truck mixing drums, tend to have at least one mixing blade that mixes aggregates within the concrete.

It is believed that a number of exemplary embodiments of the invention may be practiced using commercially available automated concrete mix monitoring equipment with little or no modification to the hardware, as would be apparent in view of the invention disclosed herein. Such concrete mix monitoring equipment is available from VERIFI LLC of West Chester, Ohio, under the trade name VERIFI®.

The concept of "dose response" as used herein shall mean and refer to the effect of a particular additive as a function of the administered dose of cement dispersant (e.g., water and/or chemical admixture) and of an ACA (chemical admixture) on a rheology property (e.g., slump) and entrained air property in a hydratable cementitious mix such as concrete. This concept has particular relevance to FIGS. 1 through 5, which illustrate how the present invention functions to permit rheology (e.g., slump) and entrained air content targets to be prescribed by the end user (e.g., contractor, customer, truck operator, or other customer) and to be achieved by the system (e.g., hardware/software mounted on ready-mix truck, or connected to concrete plant stationary mixer, etc.).

As illustrated in FIG. 1, the methods of the present invention permit an operator to specify, into the CPU of a mix process control system, a rheology target (such as slump, which will be used in this section for illustrative purposes, expressed in terms of slump in inches, the slump target being most often expressed as a range) as designated as at "$S_T$"; and an air content target (e.g., in terms of percentages based on volume of concrete, usually expressed as a range) as designated as at "$A_T$". The point designated as at "1" represents the current slump and air content of the concrete mix being mixed in the concrete mixer, while the Slump-Air targets ($S_T$ and $A_T$) are illustrated as a rectangle, designated as at "2." The Slump-Air targets are defined respectively in terms of slump in length (e.g. inches or mm) and entrained air content as a percentage of concrete volume. The CPU is programmed to retrieve from CPU-accessible memory (which may, for example, be stored on the concrete ready-mix truck or accessed through electronically and/or wirelessly to a central dispatch or control center) at least four sets of data containing correlations. These at least four correlations refer to data sets regarding the effects of ACA and cement dispersant in concrete, including: (i) effect of cement dispersant on rheology (e.g., slump where $S_T$ has been specified); (ii) effect of ACA on air content; (iii) effect of ACA on rheology (e.g., slump where $S_T$ has been specified); and (iv) effect of said cement dispersant on air content.

Thus, FIG. 1 represents by the arrow designated as at "3" the change in both the (entrained) air content and the slump for dosage increases in the air control admixture component; while the arrow designated as at "4" represents the change in both air content and the slump for dosage increases in the cement dispersant component. The arrow designated as at "5" represents the combined effect on air and slump with dosage increases in the two components.

Figure 2:
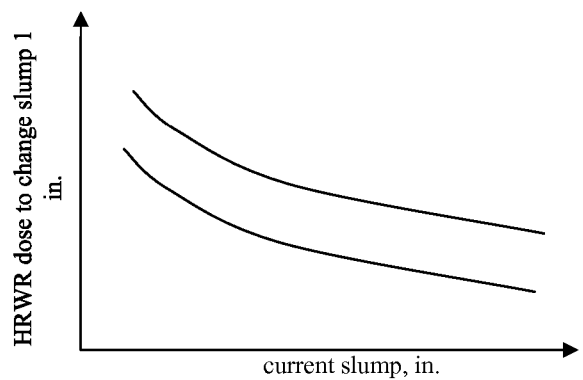
FIG. 2 is a graphic illustration of current slump (inches) of concrete plotted as a function of the amount of rheology modifying agent (e.g., a cement dispersant referred to as a High Range Water Reducer or "HRWR") required to change slump by one inch.
Figure 3:
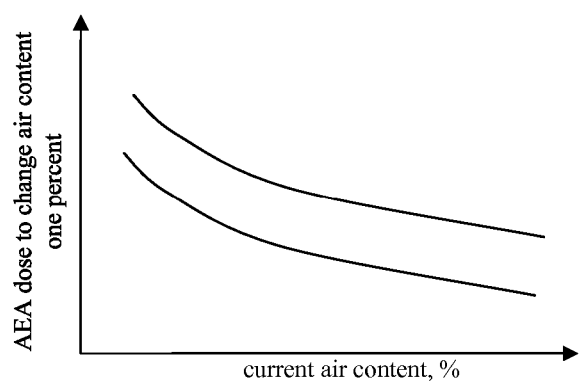
FIG. 3 is a graphic illustration of entrained air content (%) of concrete as a function of the amount of Air Controlling Admixture (e.g., an Air Entraining Agent or "AEA") required to change air content by one percent.
Figure 4:
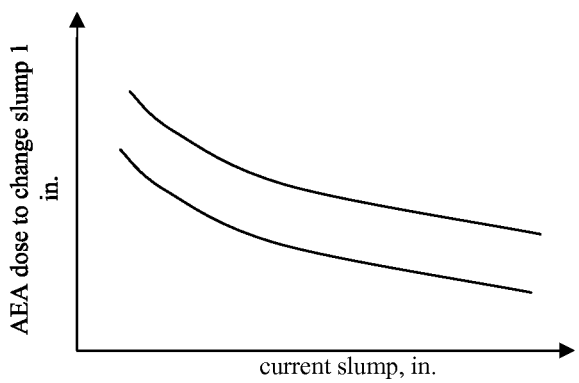
FIG. 4 is a graphic illustration of current slump (inches) of concrete plotted as a function of the amount of AEA required to change slump by one inch.
Figure 5:
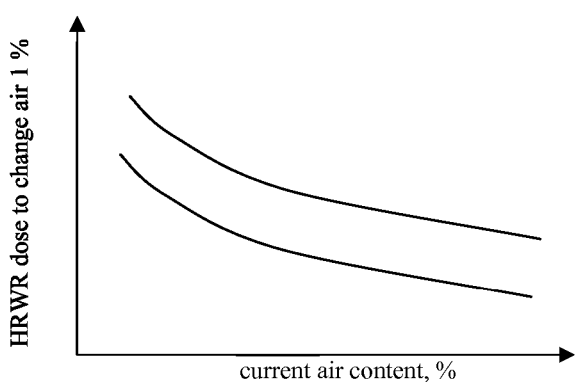
FIG. 5 is a graphic illustration of entrained air content (%) of concrete plotted as a function of the amount of HRWR required to change air content by one percent.

The aforementioned four sets of data correlations are illustrated generally in FIG. 2 through FIG. 5, each of which, for the sake of simplicity, shows two "curves." In FIG. 2, current slump (in terms of inches concrete) is plotted against cement dispersant ("HRWR" refers to High Range Water Reducer) required to change slump by one inch. In FIG. 3, entrained air content (in terms of percentage based on volume of concrete) is plotted against AEA required to change air content by one percent. Similarly, FIG. 4 illustrates slump (inches) plotted against AEA required to change slump by one inch. Finally, FIG. 5 illustrates entrained air content plotted against cement dispersant ("HRWR") required to change air content by one percent.

In each of FIGS. 2 through 5, two exemplary curves are shown. In FIGS. 2 and 4, each curve may represent different current air content. In FIGS. 3 and 5, each curve may represent different current slump.

Figure 7:
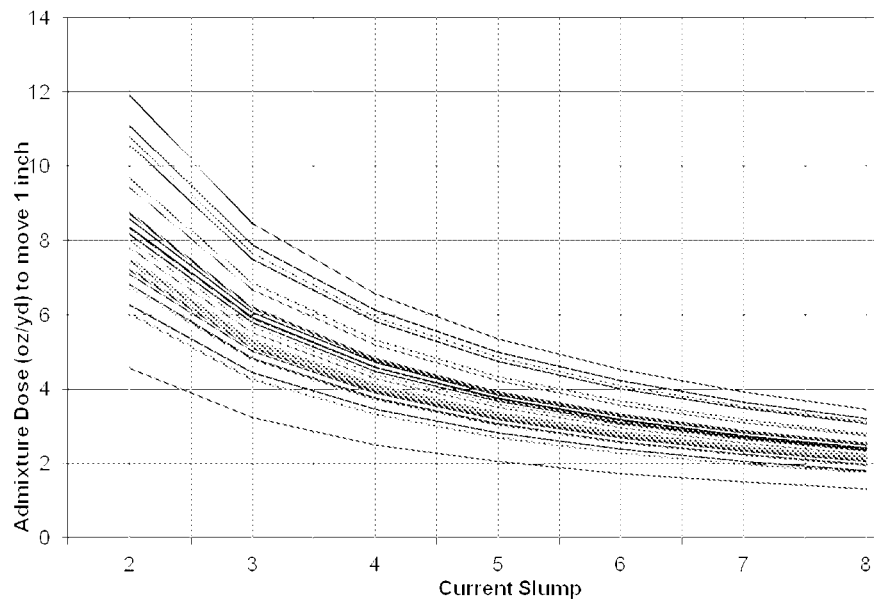
FIGS. 7 and 8 are graphic illustrations of other dose response curves for concrete mixes whereby the initial slump (horizontal axis) is expressed against the dose required to increase slump by one unit (vertical axis)
Figure 8:
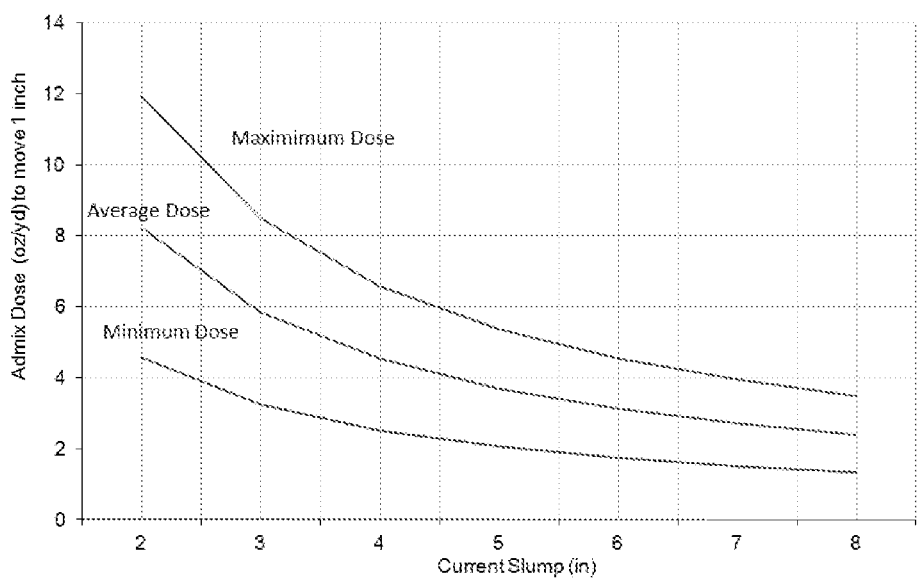

In preferred methods and systems, each of these data correlations as illustrated in FIGS. 2 through 5 should be based on a plurality of data sets. An example is provided in the case of cement dispersant effect on slump as shown in FIGS. 7 and 8. FIG. 7 illustrates a plurality of data curves for various cement dispersants in different concrete mixes. FIG. 8 illustrates that an average or median value can be obtained or generalized from the data set and used for adjusting and dosing the concrete mixes. This approach is applicable to each of the data set correlations which have been graphically illustrated in FIGS. 1-4, and thus employed in the implementation for the method of monitoring and adjusting air and slump which was graphically illustrated in FIG. 1.

Figure 6:
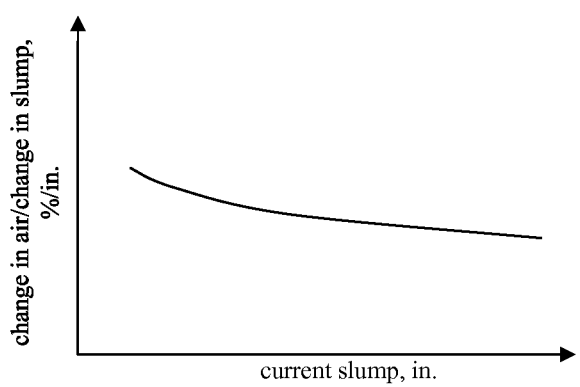
FIG. 6 is a graphic illustration of alternative method of the present invention whereby current slump (inches) of concrete is measured as a function of the ratio of amount of the amount of change in entrained air content (%) divided by the amount of change in slump (inches) for a given dosage of a chemical admixture.

FIG. 6 is a graphic illustration of alternative method of the present invention whereby current slump (inches) of concrete is measured as a function of the ratio of the amount of change in entrained air content (%) divided by the amount of change in slump (inches) for a given dosage of a chemical admixture. This shows that for a current slump value, both air and slump will change when a given admixture is used. The amount of this change can be represented graphically. This graph can be updated as additional data is collected.

The present inventors would like to acknowledge at this point that FIGS. 7 and 8 are derived from related U.S. patent application Ser. No. 12/821,451 filed on or about Jun. 23, 2010 (entitled "Method for Adjusting Concrete Rheology Based Upon Nominal Dose-response Profile"). In '451, Koehler et al. described an unexpected dose response behavior which appeared when different concrete mixes, into which a (polycarboxylate) cement dispersant was admixed, demonstrated similarly shaped dose response curves, wherein slump was shown as a function of the dose amount (ounces of admixture per cubic yard of concrete) required to change slump by one unit (such as from 2 to 3 inches slump, and from 3 to 4 inches slump, and so on). The calculation of a nominal dose response ("NDR") profile was illustrated therein in FIG. 2 (and in the present application herein as FIG. 7) wherein at least two profile curves (labeled "maximum dose" and "minimum dose" for convenient reference) are considered to provide one NDR profile.

As discussed in U.S. Ser. No. 12/821,451, the significance of the non-intersecting behavior of the nominal dose response curves (See e.g., FIG. 7 herein) led Koehler et al. to the realization that one could adjust concrete rheology through use of an NDR profile or curve based on even one curve obtained from only one data set, although using at least two curves is preferred (See e.g., FIG. 2 herein), and using a plurality of curves (See e.g., FIGS. 7 and 8 herein) is most preferred from the standpoint of accuracy. The NDR profile can be adjusted by scaling only one parameter—namely, a ratio reflecting the actual admixture performance and that predicted by the NDR curve. Thus, an adaptive control methodology can be used to update the NDR curve information based on actual admixture performance. Each dose of admixture is selected by using the NDR curve adjusted by the scaling factor from previous additions of admixture into the same load of concrete. Thus, the doses selected are adjusted to the actual conditions associated with the concrete load without the need to measure and adjust explicitly for these parameters. In such case, the second and each subsequent doses of admixture within a load are likely to be significantly more accurate than the first dose. This eliminates a lengthy trial-and-error process where previous performance of admixture in the load of concrete is not considered. (Please note that the term "admixture" as used herein may refer to water and/or chemical additive in the case of cement dispersant).

The following explanation is taken from U.S. Ser. No. 12/821,451 of Koehler et al., which only described how one concrete property at a time (e.g., slump, air content) could be assessed. Koehler et al. did not teach or suggest how both rheology and air content could be simultaneously monitored or controlled through an integrated approach, as in the present application. The rheology of a given concrete mix can be adjusted by inputting into a computer processor unit (CPU) only the amount of the concrete (load size) and the target rheology value (e.g., slump, slump flow, or yield stress), and comparing the actual rheology to the NDR profile, adding a percentage of the nominal dose the chemical admixture that would be (theoretically) required to change the actual rheology to the target rheology, measuring the resultant change in rheology value and comparing this to the NDR value that would theoretically have been obtained using the percentage nominal dose, and then adjusting the rheology by adding a subsequent dose which takes into account the deviation measured as a result of the first percentage addition. One may therefore take into account a "learning" step to be incorporated into the methodology, without having to consider numerous parameters such as temperature, mix design, humidity, and other factors.

In U.S. Ser. No. 12/821,451, an exemplary method for controlling rheology in a concrete mixer wherein the energy required for operating the mixer is measured and correlated with a nominal rheology value and wherein a rheology-modifying agent (cement dispersant) is added into the cementitious composition to modify its rheology is said to comprise: (a) entering into a computer processor unit ("CPU") a target rheology value ("TRV") and load size for a hydratable cementitious composition containing or intended to contain a particular rheology-modifying agent or combination of rheology-modifying agents; (b) obtaining a current rheology value ("CRV") of hydratable cementitious composition contained within a mixer; (c) comparing through use of CPU the current rheology value obtained in step (b) against a nominal dose response ("NDR") profile stored in CPU-accessible memory and wherein said NDR is based on at least one data set wherein various dose amounts of a particular rheology-modifying agent or combination of rheology-modifying agents and their correlative effect on rheology value (such as slump, slump flow, or yield stress) is retrievably stored, and determining the nominal dose of said particular rheology-modifying agent or combination of rheology-modifying agents required to change the obtained CRV to the TRV specified in step "(a)"; (d) dosing the hydratable cementitious composition in a mixer with a percentage of said particular rheology-modifying agent or combination of rheology-modifying agents that is selected or pre-selected from 5% to 99% based on the nominal dose determined in step (c) required for changing said obtained CRV to said TRV as specified in step (a); (e) obtaining a subsequent CRV of the hydratable cementitious composition after the percentage of the nominal dose of the particular rheology-modifying agent or combination of rheology-modifying agents selected or preselected in step (d) is added into and uniformly mixed with said hydratable cementitious composition; comparing the dose selected or preselected in step (d) to the dose according to the NDR profile for the same change in the rheology value from step (b) to step (e), and determining the scaling factor ("SF") by which to adjust the dose from the NDR profile, where SF is defined as the actual dose from step (d) divided by the nominal dose to achieve the same change in rheology value indicated by the NDR profile; and (f) mixing into the hydratable cementitious composition the particular rheology-modifying agent or combination of rheology-modifying agents in an amount calculated in terms of SF multiplied by the dose from the NDR profile indicated to convert the current CRV measured in step (e) to the TRV specified in step (a). If the target rheology value such as slump is not attained upon completion of the steps, (which can be due to any number of factors, such as temperature or humidity change), then process steps (e) and (f) can be repeated as required. In addition, concrete rheology changes over time.

Each time the rheology value decreases by a certain amount, a rheology-modifying agent (e.g., chemical admixture) must be added to restore the rheology value. Steps (e) through (f) can be repeated to adjust the rheology value.

Thus, NDR profiles are calculated based on an average of at least two dose response curve values (see e.g., FIG. 8 herein), and, more preferably, an average of a plurality dose response curve values obtained from trialing the particular rheology-modifying agent or combination of rheology-modifying agents (See e.g., FIG. 7 herein).

It was further taught in U.S. Ser. No. 12/821,451, that the system CPU can be programmed to assume a learning mode, whereby batch histories can be incorporated into the NDR profile which is then stored into CPU-accessible memory, and/or the scaling factor can be redefined so that dosing can be rendered more accurate. In other words, the rheology value changes effected by doses of the rheology-modifying agent administered during a concrete mix delivery operation are incorporated into the nominal dose response (NDR) curve or scaling factor whereby the NDR curve or scaling factor (SF) is modified; and rheology value changes in a subsequent concrete mix delivery operation or operations are effected based on the modified NDR curve or modified SF.

The CPU is programmed to dose the hydratable cementitious composition in the mixer using a selected or pre-selected percentage of the ideal amount of the rheology modifying agent (cement dispersant component) that would be determined by the NDR profile to change the current rheology value to the target rheology value that was previously entered. That percentage may be 50% to 95% of the ideal (or nominal) amount, and more preferably would be about 50%-90%; and most preferably would be 50%-80%. Generally, the lower percentage in these ranges is preferable for this first dose until confidence is obtained.

The CPU would also be programmed to obtain a subsequent current rheology value (e.g, slump) of the concrete after the percentage of the nominal dose of the particular rheology modifying agent (e.g., cement dispersant) was added into the concrete. The CPU would compare the nominal (or theoretical) effect on the rheology value of the percentage dose selected or preselected to the subsequent rheology value and determine the scaling factor by which to adjust the dose from the NDR profile. The scaling factor is thus defined as the actual dose divided by the nominal dose to achieve the same rheology change as indicated by the NDR profile.

The CPU would be further programmed to mix into the concrete the dose of the admixture. The amount of this subsequent dose would be calculated by multiplying the scaling factor (SF) by the amount theoretically needed, according to the NDR profile, to change the subsequent current rheology value measured to the target rheology value previously specified by the operator.

The foregoing CPU program steps may be repeated whenever the current concrete property is sensed to be less than or greater than the target concrete property, when compared to a given (inputted or pre-programmed) threshold. This may be done automatically, for example, by programming the CPU to repeat the steps when the difference between the current and target values exceed a predetermined amount and thus are determined to be in non-conformance with each other. If the difference between the current and target values is less than the predetermined amount, the CPU can also be programmed to trigger an alarm to indicate to the operator that the concrete mix is ready to be discharged and poured.

Thus, an NDR profile or curve can be derived from an average of at least two curves representing the behavior of a given admixture on the concrete, as illustrated in FIGS. 2-6, and more preferably the NDR is established using an average of a plurality of dose response curves for the particular chemical admixture(s), as illustrated in FIG. 7. The dose response curves of FIG. 7 in particular suggest, by the varying curve amplitudes, that various parameters such as concrete mix design, temperature, degree of hydration, water/cement ratio, and aggregate amounts might be varying slightly (or even significantly) from batch to batch. Still, the fact that the various dose response curves did not intersect led the present inventors to realize that these other various parameters did not necessarily need to be kept constant in order to establish a nominal dosage response (NDR) profile because the average of these dose response curves would have similar behavior in terms of calculating amounts of admixture needed for changing the property of the concrete mix from (e.g., slump) one value to the next (e.g., from slump of 2 inches to five inches).

Another way of viewing the NDR profiles is to realize that they involve data sets having at least one non-homogeneous parameter, such as concrete mix design, temperature of concrete, degree of cement hydration, water/cement ratio, and aggregate amount or cement/aggregate ratio. These may be varied from batch to batch in the data sets which go to make up the NDR profile (See e.g., FIG. 1).

U.S. Ser. No. 12/821,451 disclosed many of chemical cement dispersants as previously mentioned could be used, and emphasized that so long as the same rheology-modify agent or combination of rheology-modifying agent is being used as was previously trialed for creating the nominal dosage response (NDR) profile, then other variables such as concrete mix design, amount of water or cement or water/cement ratio, aggregate selection or composition, degree of hydration, do not necessarily need to be inputted into the CPU and remain optional.

The present invention is believed to be a patentable improvement upon Ser. No. 12/821,451 in that it allows for targets in rheology and entrained air properties to be simultaneously specified and integrated into the monitoring/process control system, and also allows for separate addition of rheology modifier (e.g., cement dispersant with or without air entrainer and/or air detrainer) and separate addition of air control agents (e.g., air entrainer and/or air detrainer), despite the fact that the relationship between air entrainer effects and dispersant (slump) effects have been non-linear and historically unpredictable.

In order to achieve this, the present invention provides a "multivariate management" capability that has not been achieved, disclosed, or even suggested before. As summarized above, an exemplary method of the present invention for monitoring and adjusting entrained air and rheology levels in a cementitious mix, comprises:

(a) providing a concrete mix in a rotatable concrete mixer, said concrete mix comprising hydratable cement, aggregates, and water for hydrating said cement, and said concrete mix having a total volume when mixed uniformly of 1.0 to 15.0 cubic yards;

(b) inputting into a computer processing unit (CPU) and storing into computer accessible memory desired concrete performance ranges relative to: a slump (rheology) target or target range (hereinafter "$S_T$") wherein a desired concrete slump or slump range is specified within a range of 0-11 inches; and an air content target or target range "$A_T$" wherein a desired concrete air content or air content range is within a range of 1% to 10%;

(c) operating said concrete mix in said rotatable concrete mixer and obtaining at least one slump value in current time (hereinafter "$S_{CT}$") and at least one air content value in current time (hereinafter "$A_{CT}$");

(d) comparing using CPU said $S_{CT}$ against said $S_T$ and said $A_{CT}$ against said $A_T$ until detection by CPU of a non-conformance event, wherein said $S_{CT}$ does not conform with said $S_T$ or said $A_{CT}$ does not conform with said $A_T$; and (e) introducing into the concrete mix contained in said concrete mixer, at least one of two different types of additives comprising:

at least one chemical admixture for modifying air content in the concrete mix (hereinafter "ACA"), wherein said at least one ACA comprises at least one Air Entraining Admixture (hereinafter "AEA"), at least one Air Detraining Admixture ("ADA"), or mixture of at least one AEA and at least one ADA; and at least one cement dispersant for modifying rheology of the concrete mix, said at least one cement dispersant comprising at least one polymeric dispersant, water, or a mixture of said at least one polymeric dispersant and water;

said introducing of said at least one ACA and cement dispersant being achieved by CPU-controlled valve system in accordance with CPU-accessed memory device having at least four sets of data correlations:

(i) effect of said cement dispersant on rheology (e.g., slump);
(ii) effect of said ACA on entrained air content;
(iii) effect of said ACA on rheology (e.g., slump); and
(iv) effect of said cement dispersant on entrained air content.

It should be understood that in the description of the method steps (a) through (e) above, slump is given as an example of rheology, and that monitoring and adjustment of other rheology factors such as slump flow, DIN flow, yield stress, etc., can be substituted for the slump targets and current slump values designated respectively as at $S_T$ and $S_{CT}$.

As described in Step (b), the operator inputs into a computer processor unit ("CPU") at least two pieces of information: a target rheology value (e.g., slump, slump flow, DIN flow, yield stress, etc.) and target air content. The operator may also be required to input the load size for the concrete that will be placed into the mixer (and hence further exemplary methods involve inputting of the load size). The input of these prescribed or target data points may be performed by the batch master at the ready-mix plant, by the truck driver, or foreman at the construction site. Indeed, this input may be performed by anyone in charge of the concrete delivery, and it does not require the inputting of other parameters such as temperature, humidity, and other factors which are optional.

Also as mentioned above, the target rheology value may be any of the rheology factors whose measurement in unit values are customarily employed, such as: slump (customarily measured in terms of length units, e.g., inches); slump flow (length, e.g., inches); yield stress (customarily measured in terms of stress, e.g., pounds per square inch or pascals); viscosity (pascals·seconds); flow (length); and thixotropy (pascals/second). Load size can be inputted into the CPU in terms of total weight or volume of the batch concrete (e.g., cubic yards) including all of the components. If the target rheology value (or range) is defined in terms of slump, then the measument for slump can be done in accordance any number of standard measurements (see e.g., ASTM C 143-05, AASHTO T 119, or EN 12350-2). If the target rheology value is defined in terms of slump flow, this measurement can be done in accordance with ASTM C1611-05. If the target rheology value is defined in terms of the flow table test, this can be done in accordance with DIN EN 12350-5 (sometimes referred to as "DIN flow").

It is important that the "at least four sets of data correlations" mentioned in Step (e) include the same or similar chemical admixture components as those being used for dosing into the concrete, as well as the same or similar concentrations of such components. For example, if the "cement dispersant" component for modifying rheology of the concrete mix, as mentioned in Step (e), comprises one or more particular polymeric cement dispersants (which optionally may be formulated with other admixtures such as AEAs, ADAs, accelerators, and/or retarders), then it is important that the set of data correlations mentioned in Step (e) include the identical or similar polymeric cement dispersant(s) as formulated with any other admixtures that may be present in the product formulation as those being used for dosing into the concrete. The same applies to the chemical admixture or admixtures for modifying entrained air level ("ACA") as mentioned in Step (e). The identical or similar AEAs and/or ADAs should be used for the set of data correlations as those being used for dosing into the concrete.

It is preferable that each of the "at least four sets of data correlations" mentioned in Step (e) be based on a plurality of nominal dose response (NDR) curves or profiles derived from the same component being dosed into the concrete. Hence, one will need to generate new NDR profiles for a cement dispersant package component, to the extent that adding or omitting a particular active ingredient from the chemical admixture(s) formulation is seen to affect rheology and to affect air content. If for example a desired swap in the cement dispersant package component affects both rheology and entrained air levels, one needs to generate new NDR profiles for each of the rheology behavior as well as entrained air behavior.

Among the benefits of using NDR profiles is that they are self-correcting, and they may possibly allow for high accuracy, even where the cement-dispersing polymer is different and where other active ingredients might be different in nature and amount. However, when using the method of the present invention, it is preferable to start with the same cement dispersants and same ACAs to compensate for any differences in their concentrations.

In Steps (c) and (d) of the exemplary method of the present invention being described herein, it is necessary for the CPU to determine the current rheology state and current air content value of the concrete contained within the mixer. This is stored in CPU-accessible memory because it will provide a reference point for later steps.

In Step (d) of the exemplary method, the CPU compares the current rheology state and current entrained air value obtained in Step (c) with target values that were inputted in Step (b). If there is a discrepancy, such as the current entrained air value falling outside of the range specified in Step (b), then the CPU will access one or more of the sets of data correlations (i) through (iv) mentioned in "Step (e)."

Preferred methods and systems of the present invention employ at least four different sets of data correlations, each of which are preferably generated using a plurality of data sets (e.g., curves or profiles). In other words, as described in Step (e), a plurality of NDR profiles should be generated and stored relative to: (i) the effect of the cement dispersant on rheology (e.g., slump); (ii) the effect of the ACA on entrained air content; (iii) the effect of the ACA on rheology (e.g., slump); and (iv) the effect of the cement dispersant on entrained air content.

As previously mentioned, the "cement dispersant" component may comprise water, one or more chemical admixtures such as a polycarboxylate polymer type admixture, or even both, and this cement dispersant component may further comprise an AEA, ADA or mixture thereof; while the "ACA" component can comprise same or similar AEA, ADA, or mixture thereof.

In many cases, it is expected that the adjustment of the current rheology value or current air content of the concrete mix, such that these will fall within targets, can be accomplished using either cement dispersant component or ACA component, or combination of both.

In this light, it can be evident that FIG. 1 illustrates the situation where the current air content (as illustrated by the point designated as at "1") is expected to be below target air content ("$A_T$") such that an AEA will need to be added into the concrete to elevate air content to reach the target "2" (rectangle). In most cases, the present inventors would expect the point ("1") representing current air and slump to be located below and left of the rectangle in most cases; and it could be possible that the point 1 could be located to the left of, but also located above, the rectangle 2 in which case an Air Detraining Agent (ADA) would need to be added into the concrete to decrease entrained air content to reach the target "2" (rectangle).

It will also be evident that FIG. 1 illustrates the situation where, based on the data being graphically illustrated by the entrained air curve "3" and slump behavior curve "4," both an AEA and cement dispersant will need to be added to move air and slump properties of the concrete mix within the target "2" (rectangle). If the current air or slump properties (shown as point "1" in FIG. 1) were closer to the target "2," it could be possible to introduce either the ACA or cement dispersant component alone into the concrete mix in order to attain the target "2."

In cases where both of the ACA and cement dispersant need to be added into the concrete mix so that as to attain the target "2," the CPU can be programmed to specify whether the components are to be favored in terms of volume amount being introduced into the concrete. Further exemplary methods and systems of the present invention, therefore, include the additional step of inputting a preferred addition order or percentage of the ACA or cement dispersant component. If the cement dispersant component were comprised of only or mostly water, it may be desirable to introduce the ACA component to attain the target "2" (as large water content in the concrete mix could potentially decrease strength properties of the concrete). On the other hand, if economy is the primary goal, the CPU can be programmed to make a benefit/cost determination, such that the least expensive component is used for achieving the necessary adjustment needed for attaining the target "2".

Generally, however, it is expected that if the current slump was determined to be outside of the target slump range, the cement dispersant would be used to make an adjustment such that the current slump of the mix is brought back to within the target slump range. If both the current slump and current entrained air content are determined (Step (d)) to be in non-conformity with the target ranges inputted into Step (b), then the CPU will access the sets of data correlations stored in computer-accessible memory, and send a signal to a valve for injecting a particular amount of cement dispersant into the concrete mix (where the NDR profiles provide that the adjustment of the mix to the target slump and entrained air content can be made using the amount of cement dispersant alone); or the CPU will send signals to two valves, one for introducing the cement dispersant into the concrete mix, the other for introducing ACA into the concrete mix, where the use of cement dispersant alone would not be sufficient for adjusting the current entrained air content such that it conforms with the target range for air content (as inputted at Step ((b)).

It could also be the case that the CPU could select the ACA alone to be injected into the concrete mix, where both the current air content and slump were determined to be in non-conformance with the target air content and rheology, provide that a particular amount of ACA were sufficient to adjust both the current rheology and entrained air content such that they could be made to conform to the target range (as inputted at Step (b)).

In further exemplary methods and systems of the invention, the NDR curves are preferably based on at least four sets of data correlations involving at least one non-homogeneous parameter selected from concrete mix design, concrete mix ingredient source, temperature, degree or extent of hydration, water/cement ratio, and aggregate amount. As the use of more NDR curves are used in establishing a profile, at least two or three, or even more, of these non-homogeneous parameters may occur without hindering reliability of using the NDR profiles for adjusting air and slump of concrete mixes.

In further exemplary methods and systems, the data regarding changes in entrained air and rheology on the concrete mix as effected by doses of ACA and cement dispersant administered during a concrete mix delivery operation are incorporated into the nominal dose response (NDR) curves and scaling factors whereby NDR curves and scaling factors (SF) are modified; and subsequent air and rheology changes in the same or a subsequent concrete mix delivery operation are effected based on the modified NDR curves and/or modified SF data.

In still further exemplary methods and systems, the CPU communicates electronically and/or wirelessly with CPU-accessible database memory having data relative to said changes in entrained air and rheology on concrete mixes as effected by doses of ACA and cement dispersant administered during concrete mix delivery operation and incorporated into said nominal dose response (NDR) curves and scaling factors whereby said NDR curves and scaling factors (SF) are modified, as well as data relative to air and rheology changes in the same or a subsequent concrete mix delivery operations as effected based on said modified NDR curves or modified SF.

For example, it is contemplated by the present inventors, that the at least four sets of data correlations can be transferred by cable or wireless transmission (e.g., flash drive, internet, radio frequency, etc.) to a central computer data base (such as located at central dispatch location or other office) from which it can be accessed by individual CPUs within the mixing truck fleet.

Still further exemplary methods and systems of the present invention may comprise the use of NDR profiles derived from at least four data set correlations (See Step (e)(i) through (e)(iv) each of which involves concrete mix operations involving at least two non-homogeneous parameters, and even more than two non-homogeneous parameters, selected from different concrete mix design, concrete mix ingredient source, temperature, hydration, water/cement ratios, different aggregate amounts or ratios, and concrete mix designs. So long as the particular admixture components (e.g., water and/or concrete admixture or combination of chemical admixtures) used for setting up the NDR profiles and for obtaining a current entrained air values and rheology (slump) values is/are identical or substantially similar, the slope behavior of the NDR curves is similar from one air value or rheology value unit to the next. In fact, even if two or more admixtures vary in composition but are similar in performance, it may be possible to use the same NDR profile for all such admixtures.

In further exemplary embodiments of the invention, the process of monitoring entrained air and rheology changes can involve the use of more than one type of ACA and more than one type of cement dispersant, with each type of admixture component having its own scaling factor, NDR profile, or both. For example, one can establish NDR profiles for combinations of ACA components and cement dispersant components with each of these further comprising one or more additional additives, including: viscosity modifying agents (e.g. thickeners, thixotropy modifying agents); set accelerators, set retarders, or mixture thereof; corrosion inhibitors, water repellents, strength enhancing agents; and other additives and mixtures thereof.

In still further exemplary methods and systems of the invention, more than one air and/or rheology target can be specified and met within the same concrete mix delivery operation. For example, one may use multiple air and/or rheology targets, such as air and/or slump target(s) during transit (from batching or plant operation to job site) and during placement (after the truck arrives at the job site where the mix is to be poured). As another example, one may define two different targets that the concrete mix will attain within the same delivery operation/process and at the same time, such as slump flow and plastic viscosity. It is possible, in other words, to have one rheology-modifying agent or combination of agents (e.g., admixture packages) for modifying the slump flow (characterized by the spreading of concrete from a removed slump cone) and to have another rheology-modifying agent or combination of agents for modifying the plastic viscosity (characterized by shear stress divided by the shear rate).

In a further exemplary embodiment, the scaling factor is calculated as a weighted average of all dose responses in a given load or mix design. In other words, in a series of delivery operations in which various scaling factors are derived, the scaling factor used in the current delivery operation can be based on an average of all scaling factors computed, but primarily based on data obtained from the most recent delivery operations.

The correlations between the effect of the ACA admixture component and rheology modifying admixture component on the respective properties of the concrete mix (e.g., air and slump) can be calculated using various methodologies.

The four data correlations which can be stored in computer-accessible memory for use by the CPU (e.g., effect of cement dispersant on slump, effect of cement dispersant on air, effect of ACA on slump, and effect of ACA on air) can be calculated, for example, using the following representative function:

$$0 = a(Sp)^m + b(ACA)^n + c(S_{CT})^o + d(A_{CT})^p + e(S_T)^q + f(A_T)^r$$

wherein a, b, c, d, e, f, m, n, o, p, q, and r are empirical regression values determined from past data and "Sp" represents the amount of slump modifying admixture (e.g. volume), "ACA" represents the amount of Air Controlling Admixture, "$S_{CT}$" represents rheology at the current time (e.g., slump as may be determined for example in accordance with ASTM 143), "$A_{CT}$" represents air content at the current time in terms of percentage total volume of concrete; "$S_T$" represents the target slump (ASTM 143), "$A_T$" represents the target entrained air content in terms of percentage total volume of concrete. During a concrete delivery, all parameters except Sp and ACA are known. The empirical regression values are determined from past concrete data. The values of S and A are determined by the measurement equipment on the truck. The values of $S_T$ and $A_T$ are programmed into the CPU. Therefore, it is necessary to solve for the values of Sp and ACA. This can be done using known non-linear optimization techniques. Because there are two unknown variables, additional constraints must be set. These could include, for example: minimize Sp, minimize ACA, or minimize cost. In addition, all values for Sp and ACA must be non-negative.

In still further exemplary embodiments, it is contemplated that more than four different sets of data correlations may be stored in CPU-accessible memory for the purpose of adjusting properties of the concrete mix using more than two chemical admixtures. For example, methods and systems of the present invention can permit adjustment of the air and/or rheology of the concrete mix through three or more separate admixture components, such as: (1) cement dispersant (water and/or chemical admixture); (2) air entraining agent, and (3) air detraining agent. In this case, the database will have six sets of data correlations (or NDR curve profiles) based on the effect of each of these three components on, respectively, the entrained air and rheology (slump) of the concrete, as well as the scaling factor data for adjusting the concrete values through controlled additions of the three components.

In still further embodiments, the CPU-accessible database memory contains stored information or data regarding one or more of concrete mix design, concrete mix ingredient source, concrete temperature, water/cement ratio, and time since batching for each data point relative to said changes in entrained air and rheology of concrete mixes as affected by doses of ACA and cement dispersant administered during concrete mix delivery operation.

In still further embodiments, the CPU-accessible database memory contains stored information or data regarding one or more of concrete mix design, concrete mix ingredient source, concrete temperature, water/cement ratio, and time since batching and one or more of these data is used to select the nominal dose response curve or scaling factor.

The methods of the invention are expected to be employed for measuring and adjusting any rheology characteristic of the concrete, including slump, slump flow, and yield stress. Measurement and adjustment of slump will probably of greatest concern, but the inventors believe that other rheology characteristics such as slump flow or DIN flow could be monitored and adjusted using the present invention methodologies.

In further exemplary methods of the invention, the method of the invention wherein both ACA and cement dispersant components are fed into the concrete mixer when the concrete mix is monitored and found to be in non-compliance with slump and air content targets can be suspended for a portion of the delivery trip, wherein the CPU can be programmed simply to add the concrete dispersant component in order to reach rheology target (or targets), and possibly also to reach air content target. It may be possible, after concrete ingredients (e.g., cement, aggregates, water) are loaded into the mixer to make the concrete mix, that only the cement dispersant component (water, water reducing admixture such as a superplasticizer) needs to be added until the concrete mix reaches $R_T$ and $A_T$ and the concrete can be maintained using only water reducing admixture to maintain both $R_{CT}$ and $A_{CT}$ within $R_T$ and $A_T$. Thereafter, when the delivery mix truck approaches and/or enters the construction site, the CPU can be programmed to activate use of both water-reducing admixture and ACA in order to maintain both $R_{CT}$ and $A_{CT}$ within $R_T$ and $A_T$.

In still further exemplary methods, concrete should be mixed a prescribed amount to ensure the cement dispersant or AEA is fully distributed throughout the mix. For example, if concrete is mixed in a rotatable mixing drum, the number of revolutions required for full mixing can be set based on the identity of the cement dispersant and/or ACA added. This full mixing should be provided prior to discharging concrete or repeating step (c).

The following examples are provided for illustrative purposes only, and are not intended to limit the scope of the present invention.

Example 1

The following section describes how to generate a dosage response curve or profile for a given admixture, in this case a cement dispersant used for generating a slump profile. A concrete mixture is made in a laboratory mixer without any chemical admixtures added. Slump is measured by removing sample portions of concrete and placing them in a slump cone in accordance with ASTM C143-05. Air content is also measured. When this test is done, the tested mixture is discarded. Immediately thereafter, another concrete mixture having the same concrete mix design is made in the same laboratory mixer, but this time with a chemical admixture (e.g., polycarboxylate polymer cement dispersant). Slump and air content are again measured. When this test was done, the mixture is discarded. A number of further successive samples based on identical mix factors (e.g., temperature, type of cement, amount of air and water, water/cement ratio, etc.) can be made in the laboratory mixer, but each varying only in the dosage amount of the admixture. Except for the admixture dose, all other variables should be kept constant. Each successive mixture should be discarded after testing. The resultant data, if plotted, will resemble one of the plotted lines shown in FIGS. 2 and 5.

The above process is then repeated, but for each reiteration one of the mix factors is varied while all other mix factors were kept constant. The varied mix factors can include: temperature of the materials, the amount and type of cement, type of fine aggregate, type of coarse aggregate, amount of air in concrete, amount of water, and ratio of water to cement. The data for these concrete mixes having a varied mix factor are also plotted as various lines shown in FIG. 1.

Surprisingly, when the above method was performed, it was discovered that the dosage response curves, as shown in FIG. 7, did not intersect. The concrete mix property (slump for example) can be adjusted by reference to the behavior of any curve or an average of all such dosage response curves, and the behavior of such curve or plurality of curves can serve as a nominal or reference dosage response curve during real time production-operation.

(As previously explained, FIG. 8 is a simplified version of FIG. 7 showing "minimum," "maximum," and average dosage response curves. The average dose response curve shown in FIG. 7 can serve as a nominal dosage response curve during real time production-operation).

Example 2

The NDR profile or curves based on polycarboxylate cement dispersant mentioned in Example 1 above was tested in the field using a concrete mix truck having an automated monitoring and dosing system provided by Verifi LLC of Ohio available under the trade name VERIFI®. This monitoring system measured slump based on hydraulic pressure and mix drum speed. This system can also inject cement dispersant admixture into the mix drum from a small chemical storage tank mounted on the fender. (See also US Patent Publication 2009/0037026 of Sostaric et al.). Over a period of months, a variety of concrete mixes were prepared in the concrete mix truck. A nominal dose response profile was obtained, similar to that described above in Example 1, and this was used as the reference or "nominal" reference dose ("NDR") profile.

A number of tests were run using the exemplary method of the invention for different concrete mix delivery operations, wherein the NDR was used by the computer processing unit of the automated monitoring and dosing system for each successive concrete mix sample prepared in the mix drum. Mixes produced in the drum over the next few weeks experienced natural variations in terms of temperature, raw materials, mixture proportions (e.g., water/cement ratio, water/aggregate ratio, fine/coarse aggregate ratio, etc.). And water reducing admixture (polycarboxlate cement dispersant) was dosed in accordance the NDR profile.

The use of NDR profile as a reference to adjust the current slump resulted in changes to the concrete mix similar to those suggested by the NDR profile. When the NDR curve is first applied, the slump change is then used to develop the scaling factor (SF) which is then used on the next addition of admixture.

In further exemplary methods of the invention, concrete is mixed in the mixer, after Step (e), for a number of revolutions of the concrete mixer in accordance with the identity of the cement dispersant introduced into the concrete and/or the ACA. This is performed either before discharging the concrete from the mixer, or before repeating step (c). In still further exemplary methods, Steps (c) through (e) are repeated, at least once and more preferably more than once, until the concrete is discharged from the mixer.

Figure 9:
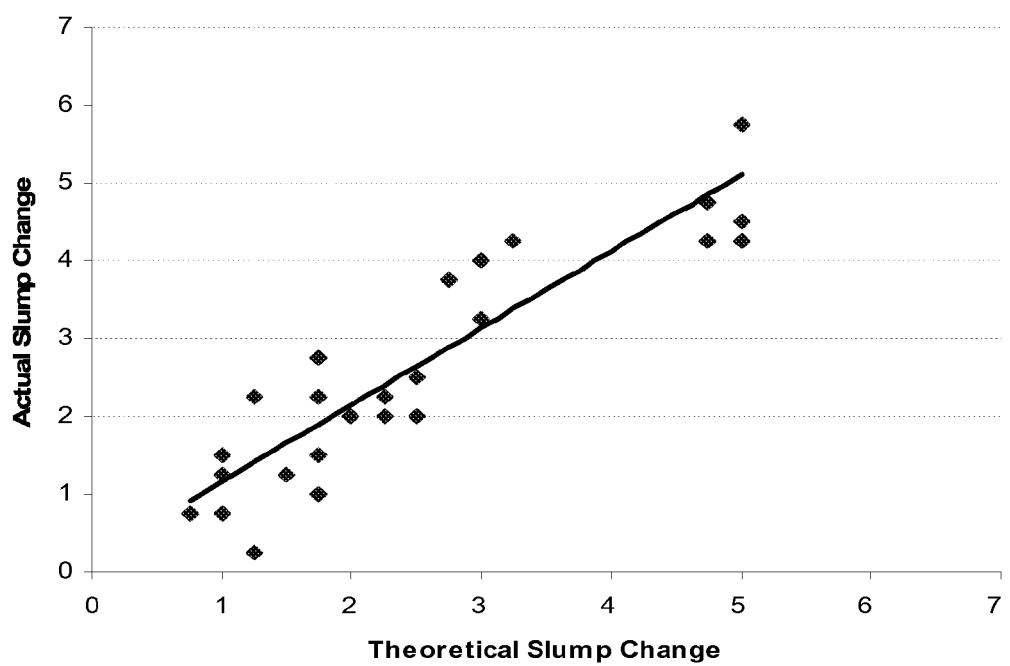
FIG. 9 is a graphic illustration wherein actual measured slump change values (shown by the dots) are seen to closely match theoretical slump change values in accordance with nominal dosage response curves or profile, based on testing of cement dispersant on slump of concrete mix.

FIG. 9 illustrates that the actual measured slump change values (shown by the dots) closely match the theoretical slump change values.

Example 3

It is contemplated by the present inventors that NDR profiles can be generated from the curves based on at least four different data correlations, such as the effect of said cement dispersant on rheology (e.g., slump); effect of ACA on entrained air content; effect of said ACA on rheology (e.g., slump); and effect of cement dispersant on entrained air content. Preferably, the NDR profiles are based on a plurality of various delivery operations, involving heterogeneous parameters (e.g., selected from various concrete mix designs, concrete mix ingredient sources, temperatures, degrees of hydration, water/cement ratios, and aggregate amounts. Each of the four sets of data correlations (as illustrated in FIGS. 2-5 would be expected to appear with the same or similar non-intersecting characteristic of the NDR curves in FIG. 7). In preferred embodiments, the data could be transmitted from each individual CPU unit (e.g., in each process control system for the concrete delivery mix truck, or stationary concrete plant mixer) to a central database for access in the future by the individual CPU units, so as to permit use of updated NDR profiles.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Skilled artisans can make variations and changes without departing from the spirit of the invention.

The invention claimed is:

1. A method for monitoring and adjusting slump and air content in a cementitious mix, comprising:
    (a) providing a concrete mix in a concrete mixer drum, said concrete mix comprising hydratable cement, aggregates, and water for hydrating said cement, and said concrete mix having a total volume when mixed uniformly within the concrete mixer drum of 1.0 to 15.0 cubic yards;
    (b) inputting into a computer processing unit and storing, into computer processing unit-accessible memory, concrete performance ranges relative to:
        a target slump or target slump range; and
        a target air content or target air content range wherein a concrete air content or air content range is within a range of 1% to 10%;
    (c) mixing the concrete mix in the concrete mixer drum and obtaining at least one slump value in current time and at least one air content value in current time;
    (d) comparing, using the computer processing unit, the at least one slump value in current time against the slump target or slump target range and the at least one air content value in current time against the target air content or target air content range until detection by the computer processing unit of a non-conformance event, wherein the at least one slump value in current time does not conform with the target slump or target slump range and/or the at least one air content value in current time does not conform with the target air content or target air content range; and
    (e) introducing into the concrete mix contained in said concrete mixer drum, one of at least two compositionally different additives comprising:
        at least one chemical admixture for modifying air content in the concrete mix, wherein the at least one chemical admixture for modifying air content in the concrete mix comprises at least one air entraining admixture, at least one air detraining admixture, or mixture of at least one air entraining admixture and at least one air detraining admixture; and
        at least one cement dispersant for modifying slump of the concrete mix, said at least one cement dispersant comprising at least one polymeric dispersant, water, or a mixture of said at least one polymeric dispersant and water;
said introducing of the at least one chemical admixture for modifying air content in the concrete mix and/or at least one cement dispersant being achieved by computer processor unit controlled valve system in accordance with computer processor unit accessed memory device having at least four sets of data correlations comprising: (i) the effect of said cement dispersant on slump of the concrete mix; (ii) the effect of the at least one chemical admixture for modifying air content in the concrete mix on air content; (iii) the effect of the at least one chemical admixture for modifying air content in the concrete mix on the slump of the concrete mix; and (iv) the effect of said cement dispersant on air content of the concrete mix.

2. The method of claim 1 wherein said at least one chemical admixture for modifying air content in the concrete mix is an air entraining agent.

3. The method of claim 1 wherein said at least one chemical admixture for modifying air content in the concrete mix is an air detraining agent.

4. The method of claim 1 wherein said at least one chemical admixture for modifying air content in the concrete mix comprises both an air entraining agent and an air detraining agent.

5. The method of claim 1 wherein said at least one cement dispersant is a polycarboxylate polymer.

6. The method of claim 5 wherein said at least one chemical admixture for modifying air content in the concrete mix is an air entraining agent.

7. The method of claim 1 wherein, in Step (e), said at least four sets of correlations identified in (i), (ii), (iii), and (iv) are based on an average or mean value calculated from at least two nominal dosage response curves.

8. The method of claim 7 wherein, in said Step (e), said at least four sets of data correlations identified in (i), (ii), (iii), and (iv) are based on an average or mean value calculated from a plurality of nominal dosage response curves.

9. The method of claim 8 wherein, in said nominal dosage response curves, said at least four sets of data correlations involve at least one non-homogeneous parameter selected from the group consisting of concrete mix design, concrete mix ingredient source, temperature, degree of hydration, water/cement ratio, and aggregate amount.

10. The method of claim 9 wherein, in said nominal dosage response curves, said at least four sets of data correlations involve at least two non-homogeneous parameters selected from the group consisting of concrete mix design, concrete mix ingredient source, concrete temperature, degree of hydration, water/cement ratio, and aggregate amount.

11. The method of claim 1 wherein the changes in air content and slump of the concrete mix as affected by doses of chemical admixture for modifying air content in the concrete mix and cement dispersant administered during a concrete mix delivery operation are incorporated into said nominal dose response curves and scaling factors whereby said nominal dose response curves and scaling factors are modified; and subsequent air and slump changes in the same or a subsequent concrete mix delivery operation are effected based on said modified nominal dose response curves or said modified scaling factors.

12. The method of claim 11 wherein the computer processor unit communicates wirelessly with computer processor unit accessible database memory having data relative to said changes in air content and slump of concrete mixes as affected by doses of chemical admixture for modifying air content in the concrete mix and cement dispersant administered during concrete mix delivery operation and incorporated into said nominal dose response curves and scaling factors whereby said nominal dose response curves and scaling factors are modified, as well as data relative to air and slump changes in the same or a subsequent concrete mix delivery operations as effected based on said modified nominal dose response curves or modified scaling factors.

13. The method of claim 12 wherein the computer processor unit accessible database memory stores information on one or more of concrete mix design, concrete mix ingredient source, concrete temperature, water/cement ratio, and time since batching for each data point relative to said changes in air content and slump of concrete mixes as affected by doses of chemical admixture for modifying air content in the concrete mix and cement dispersant administered during concrete mix delivery operation.

14. The method of claim 13 where one or more of concrete mix design, concrete mix ingredient source, concrete temperature, water/cement ratio, and time since batching are used to select the nominal dose response curve or scaling factor.

15. The method of claim 1 wherein said cement dispersant comprises water and a water reducing admixture.

16. The method of claim 15 wherein water is the cement dispersant added after ingredients are loaded into the mixing drum until reaching the target slump or target slump range and the target air content or target air content range, and water reducing admixture or superplasticzer is the cement dispersant used to maintain the at least one slump value in current time and the at least one air content value in current time in the target slump or target slump range and target air content or target air content range.

17. The method of claim 1 wherein after step (e), concrete is mixed in a rotatable mixing drum a number of revolutions that is based on the identity of the cement dispersant and/or chemical admixture for modifying air content in the concrete mix added prior to discharging concrete or repeating step (c).

18. The method of claim 1 wherein steps (c) to (e) are repeated until the concrete is discharged from the mixer.

\* \* \* \* \*